United States Patent
Wallman

[11] 3,728,897
[45] Apr. 24, 1973

[54] COMPENSATED FUEL GAGE
[75] Inventor: Irwin Wallman, Great Neck, N.Y.
[73] Assignee: Consolidated Airborne Systems, Inc. Carle Place, L.I. N.Y.
[22] Filed: Nov. 16, 1970
[21] Appl. No.: 89,681

[52] U.S. Cl. .................................................73/304 C
[51] Int. Cl. ..............................................G01f 23/26
[58] Field of Search ....................................73/304 C

[56] References Cited
UNITED STATES PATENTS

| | | | |
|---|---|---|---|
| 3,083,572 | 4/1963 | Pearson | 73/304 C |
| 3,079,797 | 3/1963 | Hermanson | 73/304 C |
| 3,534,606 | 10/1970 | Stamler et al. | 73/304 C |
| 3,580,074 | 5/1971 | Wescott et al. | 73/304 C |
| 2,409,073 | 10/1946 | Sias et al. | 73/304 C X |
| 2,908,166 | 10/1959 | Johnson | 73/304 C |

Primary Examiner—S. Clement Swisher
Assistant Examiner—Frederick Shoon
Attorney—Leonard H. King

[57] ABSTRACT

A temperature sensing element responsive to the temperature of the fuel in a tank is connected in one part of the bridge circuit of a capacitance fuel gage. The temperature sensing element compensates for variations in the dielectric constant and density of the fuel and permits a linear readout of the mass of the fuel.

10 Claims, 8 Drawing Figures

INVENTOR.
IRWIN WALLMAN
BY
Leonard H. King
ATTORNEY

COMPENSATED FUEL GAGE

The aforementioned abstract is neither intended to define the invention of the application which, of course, is measured by the claims, nor is it intended to be limiting as to the scope of the invention in any way.

This invention relates to a fuel gage measuring system and more particularly to a compensation scheme for a capacitance fuel gaging device.

BACKGROUND OF THE INVENTION

Virtually all accurate fuel management systems in present use for aircraft depend upon the measurement of the capacitance between two plates inserted in the fuel tanks, between which plates fuel is located. The capacitance value is utilized to measure the volumetric amount of fuel in the tank. The capacitance measuring device not only gives a reading which is a function of the volume of fuel, but which is also a function of the dielectric constant of the fuel. By relating the dielectric constant to the density of the fuel, it is possible to have the device measure the mass of the fluid as well.

A simple means which is used for the determination of the liquid level within the tank containing a dielectric fuel, is the insertion of a probe consisting of a pair of coaxial conductive cylinders forming a capacitor whose capacitance is dependent on the liquid level, and is measuring on a continuous basis by a suitable bridge circuit. Although this technique is not limited to a cylindrical configuration, the coaxial cylinder has been used since it offers a number of advantages both physically and electrically.

Since the energy to be derived from the fuel consumed by the engines is related to its mass (B.T.U.'s per pound), rather than to its volume, it is generally desirable to convert the known volume, as measured by the 'volume sensing' probe, to a "mass indicating" readout.

Fortuitously, the molecular forces related to polarization of the dielectric substances, and hence the property referred to as the dielectric constant is closely related to the "density" exhibited by the substance. As a result, and with no further manipulation, the probe which provides a readout which is a function of volume, becomes very nearly a function of mass. However, dielectric constant changes in response to change in fuel type, batch and temperature. Hence, the extent to which the probe will readout mass is dependent on the fuel-temperature spectrum of the fuel. When the spectrum is limited this so-called uncompensated fuel gage system is a mass responsive device. However, as the spectrum varies, additional compensation means are required to compensate the density of the fuel by compensating the dielectric constant as sensed by the probe.

Various techniques have been used for accomplishing the compensation for variations in dielectric constant and density due to changes in temperature and fuel batch.

Previously, dielectric compensation by means of a capacitance reference probe located at the bottom of the fuel tank, has been used. One reason for its use is the simplicity by which it can be incorporated into the system. In a single indicator system, the capacitance probe is merely wired as the feedback element to balance the bridge. Although this results in a linear readout of mass, it is subject to external contamination and requires an additional unshielded lead wire.

Attempts have been made to eliminate the additional dielectric capacitance reference probe by utilizing the level sensing probe alone to relate sensed dielectric constant to density based on an explicit exponential equation relating the dielectric constant to density. This results in a non-linear system which is difficult to work with, particularly in multi-tank systems where fuel quantities must be read out individually and totalized simultaneously.

SUMMARY OF THE INVENTION

The readout from the fuel gage using a capacitance probe in a bridge circuit can generally be written as:

$$\theta = a \phi K \qquad (1)$$

Where
$\theta$ is the readout
$a$ is a constant
$\phi$ is the volume of the fuel in the tank, and
$K$ is the dielectric constant of the fuel.

It is found that there is a functional relationship between the dielectric constant and the density of the fuel in the form of:

$$K = f(c) d \qquad (2)$$

Where $D$ is the density of the fuel, and
$f(c)$ is the functional relationship dependent upon variations in fuels, batch, temperature, etc.

As a result, in order to have the fuel gage readout a value of the mass of the fuel, it is necessary to instrument the functional relationship $f(c)$.
The readout will then be:

$$\theta = a f(c) \phi D \qquad (3)$$

but since the product of the volume and the density is the mass of the fuel, the readout will be:

$$\theta = a f(c) m \qquad (4)$$

In order to instrument the functional relationship one method of prior art devices have used additional padder capacitors. The reference capacitors were always immersed in fuel and had a capacitance value proportional to the dielectric constant of the fuel. A second method was to make the capacitance in the probe into a non-linear reading device wherein the non-linearity was set as the functional relationship.

The present invention uses a temperature sensitive element as the compensating device rather than a dielectric constant compensating device. It is found that the dielectric constant is a function of the temperature:

$$K = f1(t) T \qquad (5)$$

Where $T$ is the temperature of the fuel at the point of a measurement. Also, the density of the fuel is a function of temperature.

$$D = f2(t) T \qquad (6)$$

As a result, a relationship can be formed between the dielectric constant and the density which is function of temperature rather than a function of the dielectric constant.

$$K = F(t) D \quad (7)$$

The accuracy of the relationship (7) is as good as that of relationship (2). Therefore, the capacitance gage system can be instrumented to readout the mass of the fuel, by using the temperature relationship (7) and the relationship (1).

$$\theta = a f(t) \phi D \quad (8)$$

or $$\theta = a f(t) m \quad (9)$$

To instrument the temperature function, temperature sensing devices are used rather than dielectric sensing devices.

It is, therefore, an object of this invention to provide a new compensation method for a capacitance fuel gage system which eliminates the aforesaid problems of the prior art devices.

A further object is to provide a compensation method which can be used with either the closed loop servo type gage system or with the feedback type system disclosed in U.S. Pat. No. 3,534,606, issued Oct. 20, 1970.

Yet another object is to provide a simple compensation device for a capacitance gage system which will permit a linear readout of mass.

A still further object is to provide a linear compensation method for a capacitance gage system based on temperature sensing rather than capacitance sensing.

Yet another object is to provide a compensation device for a capacitance gage system using a temperature responsive device.

A further object of this invention is to provide a compensation device for a capacitance gage system which has a low sensitivity to contamination.

These and other objects of the invention will become more fully apparent from the following description of the invention in conjunction with the attached figures.

THEORY OF THE INVENTION

Figure 1:
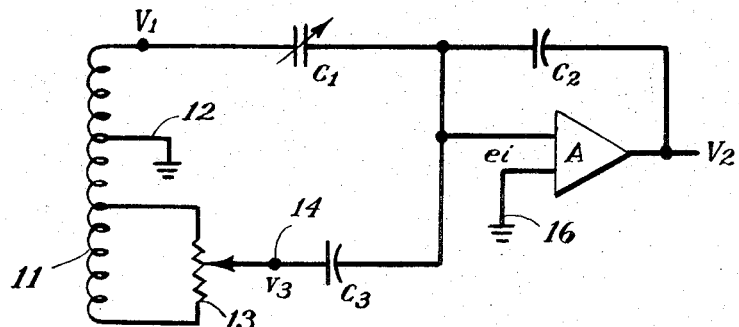
FIG. 1 is a schematic diagram of one form of an uncompensated fuel gage circuit.

FIG. 1 represents one form of a basic capacitance fuel gage 10. A potential V1 is applied across a transformer whose secondary is indicated at 11. The transformer is grounded at its midpoint 12. A capacitor $C_1$, which represents the level sensing probe is connected to one end of the secondary 11. Connected to the other end of the secondary is an "empty" adjust consisting of a potentiometer 13 across part of the secondary whose output 14 is adjusted to a potential $V_3$. A capacitor $C_3$ is placed in series with the potentiometer output. The capacitors $C_1$ and $C_3$ are joined at terminal 15. An amplifier A has one input connected to terminal 15 and the other terminal grounded at 16. The input to the amplifier is indicated as $e_1$ and the output as $V_2$. A feedback is connected between the output of the amplifier and the input terminal 15 and a capacitor $C_2$ is connected in the feedback line. It is noted that this figure forms a bridge wherein the transformer forms two arms, $C_1$ and $C_3$ from the other arms, the voltage $V_1$ is across one diagonal and the amplifier A is across the other diagonal.

Figure 3:
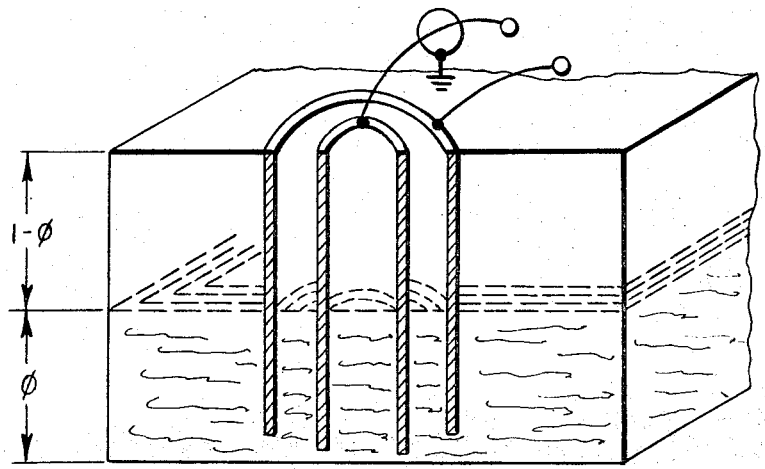
FIG. 3 is a view of a simplified capacitance fuel gage in a fuel tank.

The capacitance of the probe $C_1$ can be written as:

$$C_1 = C_{1t} + \phi C_{1a} K + (1-\phi) C_{1a} \quad (10)$$

where $C_t$ is defined as the "terminal" or "dead" capacitance of the probe, or that component of the total capacitance which is unaffected by the absence or presence of fuel; and $C_a$ is the "active" or "effective" capacitance, or that component of the total capacitance which is permeated by fuel and, therefore, increases in capacitance by the factor $K$ when fuel is present. The volume of fuel at any instant, may be expressed as a normalized value $\phi$. As shown in FIG. 3, the wetted length of probe corresponds to a volume $\phi$, whereas the unwetted portion is expressed by $(1-\phi)$, where the dielectric is an air-fuel vapor mixture with a dielectric constant essentially equal to unity.

Equation (10) may be rewritten in the form:

$$C_1 = C_{1E} + \phi (K-1) C_{1a} \quad (11)$$

where $C_{1E} = C_{1t} + C_{1a}$, and is the value of the empty capacitance of the volume sensing probe.

In FIG. 1, the output voltage V2 will be shown to be a function of volume $\phi$ and a factor involving dielectric constant $(K-1)$.

The sum of the currents into the amplifier (A) is given by the equation:

$$V_1 jw C_1 - V_3 jw C_3 - V_2 jw C_2 + e_1 jw \Sigma C \quad (12)$$

Dividing through by $(jw)$ and noting the fact that:

$$V_2 = e_1 A$$

and substituting for $e_1$ in the right hand side of (12), we obtain:

$$V_1 C_1 - V_3 C_3 - V_2 C_2 = (V_2/A) \Sigma C \quad (13)$$

Solving for $V_2$:

$$V_2 [C_2 + (\Sigma C/A)] = V_1 C_1 - V_3 C_3 \quad (13)''$$

which reduces to:

$$V_2 = (V_1 C_1 - V_3 C_3)/C_2 \quad (14)$$

for the condition $(\Sigma C/A << C_2$ which can be obtained by making "$A$" sufficiently large.

Figure 2:
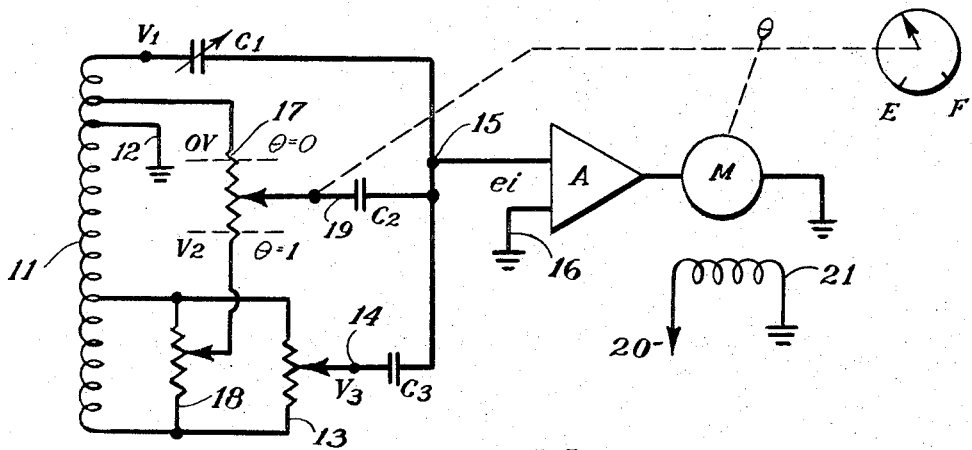
FIG. 2 is a schematic diagram of another form of an uncompensated fuel gage circuit.

FIG. 2 shows another basic form of capacitance fuel gage system. In this case a motor M is used whose output is fed back to control a second potentiometer 17 connected between the secondary winding 11 and a resistor 18 in parallel with the potentiometer 13. The feedback capacitor $C_2$ is in series with the output arm 19 of the potentiometer. The potentiometer 17 is initially set such that in the empty state the bridge is balanced with the arm in the upper position indicating zero volts. At that point the angular shaft position $\theta$ of the motor M will also be zero. For an angular shaft position $\theta = 1$ the voltage from potentiometer 17 is set at $V_2$. The motor M is connected to the output of the amplifier A and is energized by a source 20 across an energization coil 21. A meter 22 is connected to the motor M and is driven by the angular shaft position $\theta$ to readout the output value. It will be appreciated that FIG. 2 is similar to FIG. 1 and also forms a bridge circuit.

The output for FIG. 2 is the angular shaft position $\theta$ and in a similar manner as for FIG. 1 an equation can be written:

$$V_1 jw\, C_1 - V_3 jw\, C_3 - \theta V_2 jw\, C_2 = e_1 jw\, \Sigma C \quad (12)'$$

However, here it is assumed that the amplifier-motor combination produces sufficient torque to overcome friction, and that the motor phasing is so selected as to drive the potentiometer in a direction to minimize $e_1$ (null seeking). Thus, by dividing by $jw$ and assume $e_1$ approaches zero as a limit, we obtain:

$$V_1 C_1 - V_3 C_3 - \theta V_2 C_2 = 0 \quad (13)'$$

and solving for $\theta$, $$\theta = (V_1 C_1 - V_3 C_3)/V_2 C_2 \quad (14)'$$

Both equations (14) and (14)' express the output functions of their respective bridge configurations, as similar functions of the variable $C_1$.

Substitution of the value of $C_1$ from equation (10), and by adjusting $V_3$ (the "empty" adjustment) so that $V_3 C_3 = V_1 C_1 E$, reduces (14) and (14)' to:

$$V_2 = \frac{V_1 \phi (K-1) C_{1a}}{C_2} \quad (15)$$

$$\theta = \frac{V_1 \phi (K-1) C_{1a}}{V_2 C_2} \quad (15')$$

Where in (15) $V_2$ is the output variable;
in (15)' $V_2$ appears as a fixed parameter.
In both equations, $V_1$ and $C_{1a}$ are fixed, whereas $C_2$ may be fixed or a function of $(K-1)$ depending on the method of compensation used to reduce the density error as will hereinafter be described.

The relationship between the dielectric constant $K$ and the density $D$ may be written in the form of:

$$(K-1) = a [1 + b(K-1)] \quad (16)$$

Where $a$ has the dimensions of reciprocal density (gallons/pound) and $b$ is a dimensionless number.

The value $K-1/D$ is often referred to as the capacitive index. This relationship is developed by C.P. Smyth in *Dielectric Behavior And Structure* (McGraw Hill Co., 1955).

Figure 6:
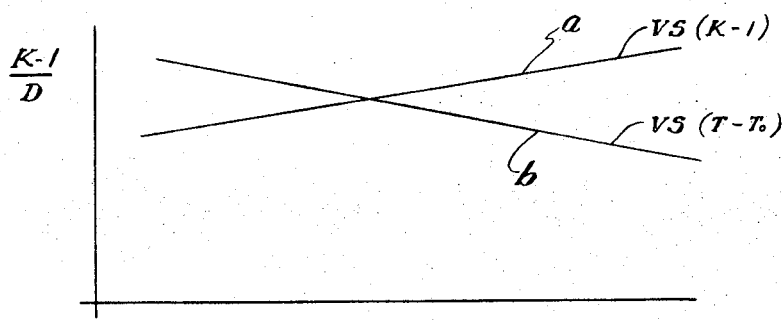
FIGS. 6, 7 and 8 represent curves useful in explanation of this invention.

The exact values of $a$ and $b$ can best be determined empirically since they vary for batch, type and temperature. A plot of $(K-1)/D$ vs. $K-1$ is shown in FIG. 6 as curve $a$.

For fuel type JP-4, equation (16) is given as:

$$(K-1)/D = 0.12192 [1 + 0.3373 (K-1)]. \quad (17)$$

As shown above, equation (15) and (15)' are the outputs from an uncompensated capacitance fuel gage. These outputs are functions of the volume $\phi$ and $(K-1)$. Substituting equation (16) into (15) or (15)', it is possible to have the output $V_2$ as a function of mass. However, in order to instrument this equation, the gage must be compensated.

One method of compensation previously used is to use an additional padder capacitor as $C_2$, positioned so that it remains covered with fuel, for all conditions, and measures the dielectric constant on a continuous basis. $C_2$ can then be expressed as:

$$C_2 = C_{2E} + C_{2a} (k-1) \quad (18)$$

The derivation for this is similar to that shown by equation (11) for $C_1$.

Factoring out $C_{2E}$ and substituting this value for $C_2$ in equation (15)'

$$\theta = \frac{V_1 \phi (K-1) C_{1a}}{V_2 C_{2E} \left[ 1 + \frac{C_{2a}}{C_{2E}} (K-1) \right]} \quad (19)$$

If the ratio $C_{2a}/C_{2E}$ is adjusted by means of added padder capacitance so that the ratio $C_{2a}/C_{2E}$ is equal to $b$ from equation (16) then, equation (19) reduces to $$\theta = \frac{V_1 \phi (K-1) C_{1a}}{V_2 C_{2E}[1 + b(K-1)]} \quad (20)$$

but from (16) this becomes $$\theta = (a V_1 C_{1a} \eta D)/(V_2 C_{2E}) \quad (21)$$

or $$\theta \alpha \phi D = m \quad (22)$$

The output response is therefore proportional to the instantaneous mass of fuel in the system.

This method of compensation is advantageous in that the output response is a linear function of mass. This results in that if a number of probes in a fuel cell are connected in parallel, each one accounting for a specific section of the total volume, they may be added directly. Also, attitude correction is not compromised. However, the capacitor feedback element which is used as a sensing device is subject to contamination due to moisture, dirt and microbial action. These have the effect of introducing a disproportionate amount of error in the system. Also, because of the extra probe, there is a requirement for a third unshielded lead, adding some weight and reducing reliability.

A second method of compensation used in the prior art involved exponential compensation.

Equation (16), if solved explicitly for $D$ is obviously a non-linear function. It is, therefore, possible to find a number of curves of different analytic form that will give a reasonable match to this equation over a limited range of interest. In particular, it would be useful if the density function of $(K-1)$ is of such a form that when multiplied by a function of $\phi$ would provide a measure of mass directly. Such a function is the exponential function.

$$K-1 = bD^n \qquad (23)$$

then, $C_1$ can be made in such a manner to have the form $$C_1 = C_{1E} + C_{1a} \phi^n (K-1) \qquad (24)$$

Thus the output response equation takes on the form:

$$\theta = [aC_{1a} \phi^n (K-1)]/C_2 \qquad (25)$$

Substituting the value of $(K-1)$ given by equation (23), the result yields:

$$\theta = (abC_{1a} \phi^n D^n)/C_2 = (abC_{1a})/(C_2) \cdot m^n \qquad (26)$$

where $m$ is the instantaneous value of mass being measured.

While this method of compensation eliminates the need for a separate dielectric compensating sensor, the output which results from the gage is non-linear. As a result, direct paralleling of probes within a tank cannot be used to sum those elements of volume upon which the particular probe has been compensated. Attempts to linearize the output of each probe through the addition of a series capacitor leaves appreciable errors in its wake.

Figure 7:
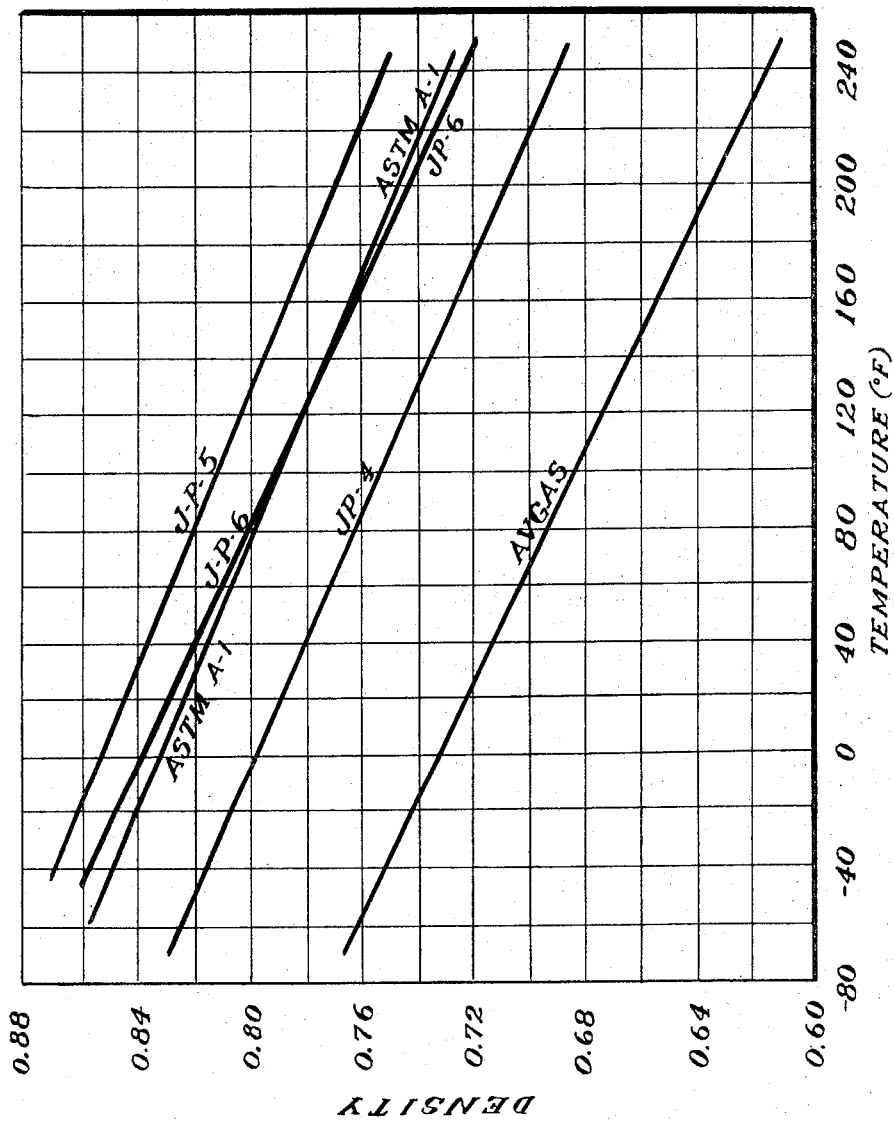
Figure 8:
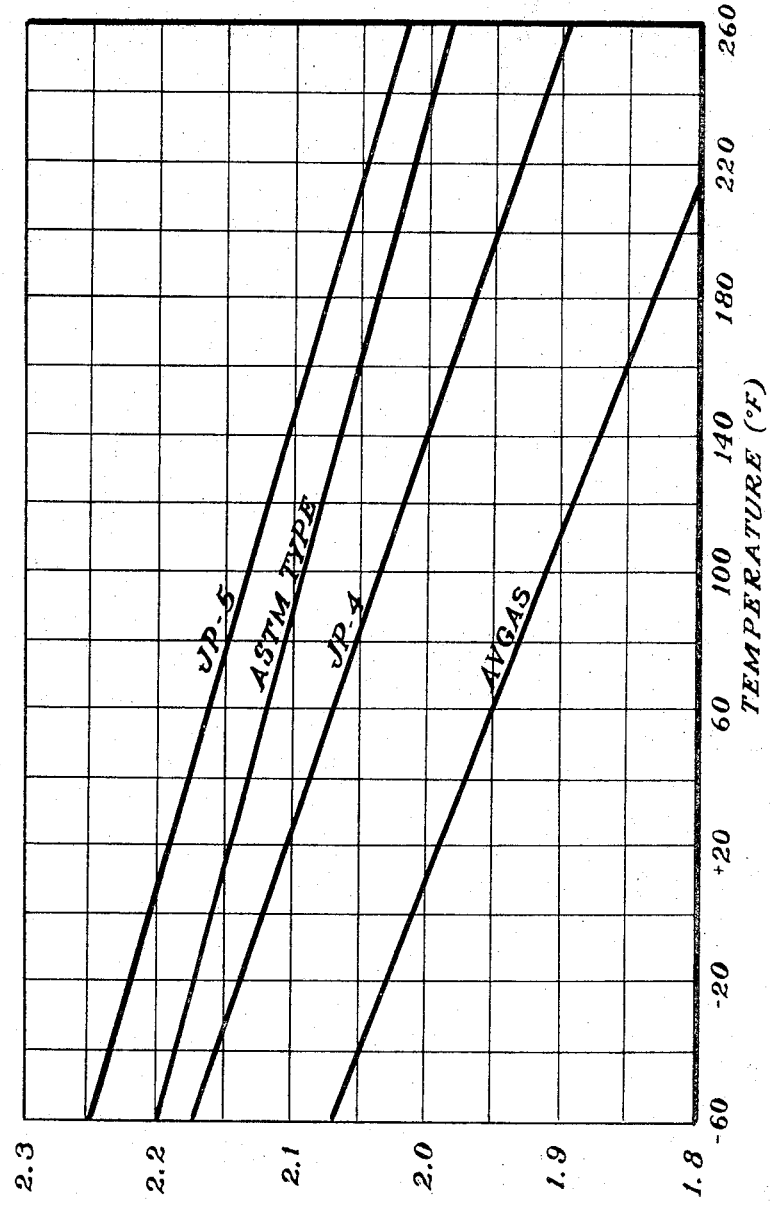

This invention proposes a unique method of compensation using temperature sensing. FIG. 7 shows a graph of Density vs. Temperature for various types of fuels. FIG. 8 shows a graph of dielectric constant vs. temperature for various fuels. From both these figures, it is noted that there is a direct relationship between Density and Temperature and between dielectric constant and temperature. As a result, a relationship can be written for $(K-1)/D$ as a function of temperature of the form:

$$(K-1)/D = E[1 - F(T - T_o)] \qquad (27)$$

wherein $T_o$ is any convenient reference temperature and $E$ and $F$ are constants.

Calculations have shown that evaluation of $(K-1)/D$ from equation (27) using the values from FIGS. 7 and 8 for a specific fuel gives the exact results as the empirical values determined for equation (16), as for example those given by equation (17) for JP-4.

The relationship shown in equation (27) is shown in FIG. 6 as curve $b$.

Figure 4:
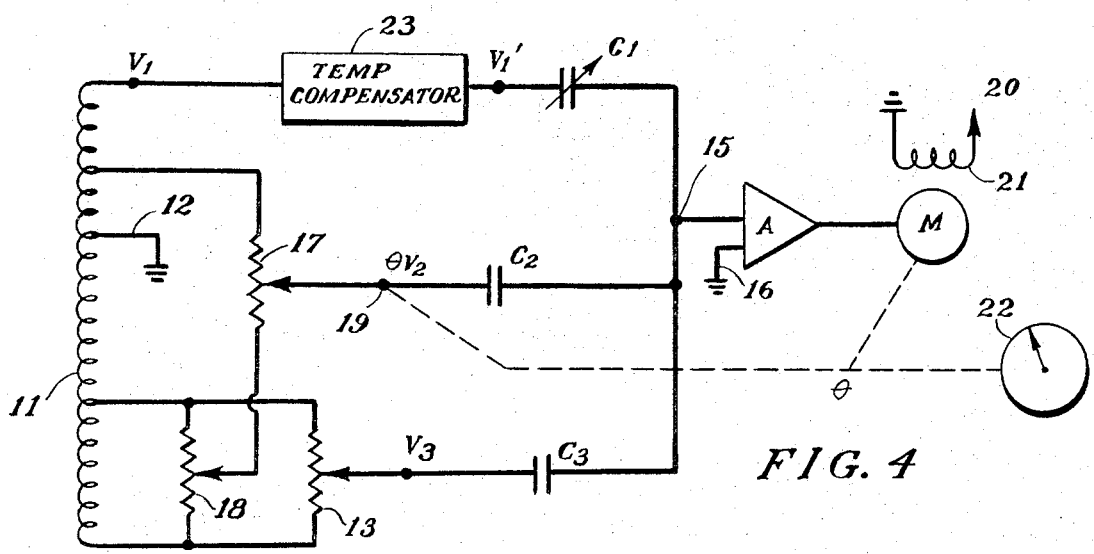
FIG. 4 is a partial block diagram of the circuit in accordance with this invention.

The compensation device used in accordance with this invention is shown in FIG. 4. This figure shows the temperature compensation network 23 connected between the $V_1$ and the capacitor $C_1$. It will be noted that this figure has the compensator added to the uncompensated circuit of FIG. 2 but a similar compensator could be added to the uncompensated circuit of FIG. 1.

The output for the uncompensated circuit of FIG. 2 was given in equation (15)'. In FIG. 4, the voltage $V_1'$ replaces the voltage $V_1$ of equation (15) and the output is written as:

$$\theta = ]V_1' \phi (K-1) C_{1a}]/V_2 C_2 \qquad (28)$$

If we let $V_1'$ be related to $V_1$ by the equation:

$$V_1' = V_1/[1 - F(T - T_o)] \qquad (29)$$

then the output can be written as $$\theta = \frac{V_1 C_{1a}(K-1)\phi}{V_2 C_2[1 - F(T - T_o)]} \qquad (30)$$

But, substituting equation (27) into equation (30), we obtain:

$$\theta = (V_1 C_1 aE \phi D)/V_2 C_2 \qquad (31)$$

or $$\theta \alpha \phi D = m \qquad (32)$$

It is, therefore, seen that by using a temperature compensator which provides the relationship (29), the fuel gage can be made to read the mass of the fuel.

DESCRIPTION OF AN EMBODIMENT OF THE INVENTION

To instrument the relationship of this invention, it becomes necessary to include a temperature sensor, in place of the dielectric cell compensator, in such a manner that the desired value of $D$ is computed and multiplied by $\phi$. Of a number of possible configurations, the bridge circuit shown in FIG. 5 permits the use of a two-wire system and provides an output that is a linear function of mass.

Figure 5:
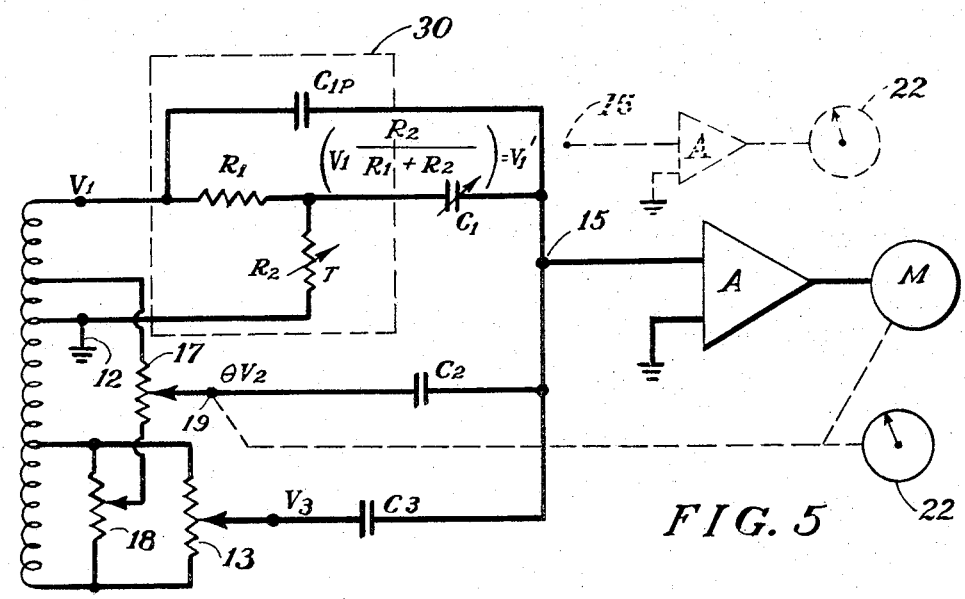
FIG. 5 is a schematic diagram of one embodiment of a circuit in accordance with this invention.

FIG. 5 shows a compensator for the servo bridge system of FIG. 2, although the same compensator could be used with the bridge circuit of FIG. 1. The compensator comprises a temperature stable resistor $R$, in series with $C_1$ and a temperature sensitive resistor $R_2$ in parallel with $R_1$. A temperature sensitive capacitor $C_{1P}$ is in parallel with $R_1$ and $C_1$. These compensator elements are placed in an assembly in a molded housing assembly 30.

The housing assembly is filled with an epoxy resin to completely encapsulate the components. This epoxy is a non-nutrient to fungi to prevent contamination. Three crimp type terminals are mounted to the housing for ease of wiring. The assembly can be fastened to the bottom of the tank by means of eyelets.

The following is an analysis of the compensator shown in FIG. 5 to show how it instruments the required relationship of $(K-1)/D$ vs. temperature.

The sum of the currents for the bridge of FIG. 5 when balanced is given by $$V_1\left[\frac{R_2 C_1}{R_1 + R_2} + C_{1P}\right] = \theta V_2 C_2 + V_3 C_3 \qquad (33)$$

solving for $\theta$:

$$\theta = \frac{V_1\left[\frac{R_2 C_1}{R_1 + R_2} + C_{1P}\right] - V_3 C_3}{V_2 C_2} \qquad (34)$$

Substituting the value for $C_1$ given by equation (10) and adjusting $V_3$ so that:

$$V_3 C_3 = V_1 [(R_2 C_{1E})/(R_1 + R_2)] + C_{1P} \qquad (35)$$

The resulting expression for $\theta$ is given by:

$$\theta = \frac{V_1 C_1 (K-1)\phi}{\left(\frac{R_1 + R_2}{R_2}\right) V_2 C_2} \qquad (36)$$

Considering the factor $(R_1 + R_2)/R_2$, and allowing $R_2$ to be a known function of temperature:

$$R_2 = R_2'[1 + \alpha(T - T_0)] \qquad (37)$$

where $\alpha$ is the temperature coefficient of the resistor and where $R_2'$ is the resistance of $R_2$ at $T_0$. We note that:

$$\frac{R_1+R_2}{R_2} = \frac{(R_1+R_2')\left[1+\frac{R_2}{R_1+R_2}(T-T_0)\right]}{R_2'[1+\alpha(T-T_0)]} \quad (38)$$

Multiplying numerator and denominator by $[1-\alpha(T-T_{AF0})]$, we obtain $$\frac{R_1+R_2}{R_2}$$
$$= \frac{(R_1+R_2')\cdot\left[1-\left(1-\frac{R_2'}{R_1+R_2}\right)\alpha(T-T_0)+\frac{R_2'^{\alpha 2}}{R_1+R_2}(T-T_0)^2\right]}{R_2'[1-\alpha 2(T-T_0)2]}$$
(39)

and for the condition:

$$\alpha_2(T-T_0)^2 \ll 1$$

the simplification of equation (39) produces $$\frac{R_1+R_2}{R_2} = \frac{(R_1+R_2')}{R_2'}\cdot\left[1-\left(1-\frac{R_2'}{R_1+R_2'}\right)\alpha(T-T_0)\right] \quad (40)$$

Substituting this result in equation (36) we obtain:

$$\theta = \frac{V_1C_{1a}(K-1)\phi}{\frac{(R_1+R_2')}{R_2'}\left[1-\left(1-\frac{R_2'}{R_1+R_2'}\right)\alpha(T-T_0)\right]V_2C_2} \quad (41)$$

where, if we choose $$\left(1-\frac{R_2'}{R_1+R_2'}\right)\alpha = F$$

from equation (27), we can substitute $(K-1)/ED$ from equation (27) so that the response $\theta$ provides a measure of mass:

$$\theta = [E R_2' V_1 C_{1a} m]/[(R_1+R_2') V_2 C_2] \quad (42)$$

noting that $m = \phi D$

However, in the empty condition, since $V_1'$ is varying as a function of temperature, there will no longer be a balance at the zero condition. Therefore, to restore the empty condition balance, the temperature sensitive capacitor $C_{1P}$ is used and allowed to vary so that $V_3 C_3$ remains constant. Or, for the constant $V_1$:

Let $C_{1P} = C_{1P}'[1 + B(T-T_o)]$ (42)' where $B$ is the temperature coefficient of the padder capacitor $C_{1P}$.
then:

$$V_3C_3 = V_1\left[\frac{R_2C_{1E}}{(R_1+R_2)}+C_{1P}'[1+B(T-T_0)]\right] \quad (43)$$

In a manner similar to that used to obtain a simplified value for $(R_1+R_2)/R_2$, it can be shown that the value for its reciprocal may be expressed as:

$$\frac{R_2}{R_1+R_2} = \left[1+\left(\frac{1-R_2'}{R_1+R_2'}\right)\alpha(T-T_0)\right]\frac{R_2'}{R_1+R_2'} \quad (44)$$

provided once again that $$\alpha^2(T-T_o)^2 \ll 1$$

whereupon we obtain:

$$V_3C_3 = V_1\left[\frac{R_2'C_{1E}}{R_1+R_2'}+C_{1P}'\right]$$
$$+V_1\left[\frac{R_2'C_{1E}}{R_1+R_2'}\left(\frac{1-R_2'}{R_1+R_2'}\right)\alpha(T-T_0)+BC_{1P}'(T-T_0)\right] \quad (45)$$

$V_3C_3$ will remain constant, if we choose $B$ so that the second term is made to equal zero for all $(T-T_o)$.

This condition is satisfied when:

$$BC_{1P}' = \frac{-\alpha R_2'C_{1E}}{R_1+R_2'}\left(\frac{1-R_2'}{R_1+R_2'}\right) \quad (46)$$

Using the embodiment of FIG. 5 with an electrical rebalance rather than the servo, as is shown in phantom, a compensation device is obtained which requires only two wires and results in a linear readout of mass. As a result, there can be a direct summing of multiple probes in a tank. Since the temperature compensator can be encapsuled there is low sensitivity to contamination.

Although the embodiment of FIG. 5 shows the use of three elements in the compensator, this arrangement could be reduced to a single temperature sensitive element, at the expense of retaining a third wire. Furthermore, either resistive or capacitive temperature sensory elements could be used. Also, in the circuit of FIG. 1, a single temperature sensitive resistance could be used in the feedback circuit instead of the capacitor, thereby eliminating all padder capacitances.

While a particular embodiment of the invention has been shown and described, it is evident that modifications may be made. The following claims are intended to cover such modifications as fall within the scope of the invention.

What I claim as new and desire to secure by Letters Patent is:

1. A capacitance mass fuel gage comprising a capacitance probe immersed in the fuel, the reactance of said capacitance being a function of the level of said fuel and of the dielectric constant of said fuel, said capacitor connected in a first arm of a bridge circuit, a center tapped transformer forming two further bridge arms, a fixed capacitor connected to a fourth arm of said bridge, energizing means adapted to be connected across one bridge diagonal, amplifying means adapted to be connected across the second diagonal, feedback means responsive to the output from said amplifying means and connected back to the input of said amplifying means and compensation means generating a temperature dependent signal having the relationship $F(t) = (K-1)/D$, wherein $K$ is the dielectric constant, $D$ is the density and $F$ being a predetermined function of temperature chosen to compensate for both density and dielectric constant, said compensation means being electrically connected within said bridge circuit.

2. A fuel gage as in claim 1 wherein said compensation means comprises a temperature stable element in series with said capacitance probe, a temperature sensing element in parallel with said temperature stable element and a further temperature sensing element in parallel with said series combination.

3. A fuel gage as in claim 2 wherein said temperature sensing element and said temperature stable element are resistors and said further temperature sensing element is a capacitor.

4. A capacitance fuel gage as in claim 1 further comprising a servomotor coupled to the output of said amplifying means, potentiometer means connected across one of said further bridge arms, said servomotor adjusting said potentiometer and said feedback means connected to the potentiometer output.

5. A capacitance fuel gage as in claim 1 further comprising a potentiometer placed in parallel with one of said further bridge arms, said fixed capacitor connected to the output of said potentiometer.

6. A fuel gage as in claim 1 further comprising an indicator wherein said fuel gage requires two wires to connect to said indicator, and wherein said indicator provides a linear readout of the mass of said fuel.

7. A fuel gage as in claim 1 wherein said compensation means is contained within a housing and said housing is filled with epoxy resin encapsulating said compensation means.

8. A capacitance fuel gage comprising a capacitance probe immersed in the fuel, the reactance of said capacitance being a function of the level of said fuel and of the dielectric constant of said fuel, said capacitor connected in a first arm of a bridge circuit, a center tapped transformer forming two further bridge arms, a fixed capacitor connected to a fourth arm of said bridge, energizing means connected across one bridge diagonal, amplifying means connected across the second diagonal, feedback means responsive to the output from said amplifying means and connected back to the input of said amplifying means, and compensation means comprising a temperature sensing element responsive to the temperature of said fuel connected in said feedback means to compensate for variations in said dielectric constant.

9. A capacitance mass fuel gage of the bridge type having a fuel level responsive capacitance in one arm of the bridge and further comprising compensation means generating a temperature dependent signal having the relationship $F(t) = (K-1)/D$, wherein $K$ is the dielectric constant, $D$ in the density and $F$ being a predetermined function of temperature chosen to compensate for both density and dielectric constant, said compensation means being connected within said bridge.

10. A fuel gage as in claim 9 wherein said compensation means comprises a first temperature sensing element serially connected in one arm of said bridge, a temperature stable element in parallel with said first temperature sensing element and a second temperature sensing element in parallel with said one bridge arm.

* * * * *